Sept. 28, 1937.　　　　　G. HEYMER　　　　　2,094,214
DEVICE FOR STOPPING MULTICOLOR FILTERS
Filed Oct. 5, 1935
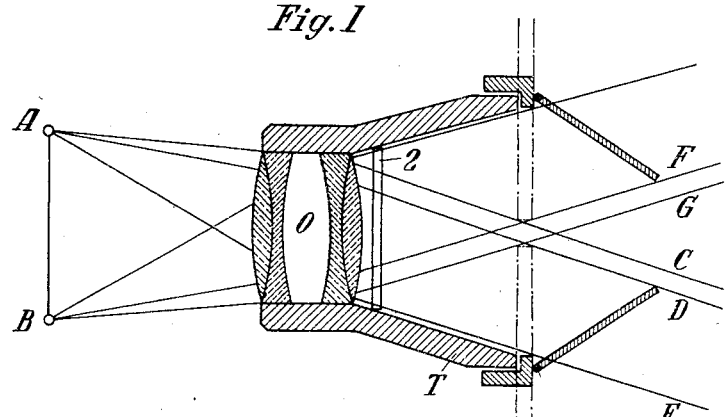
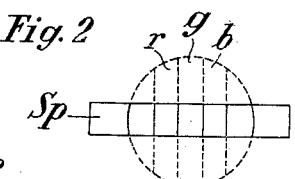
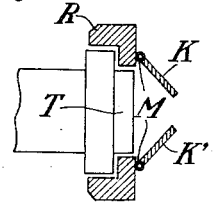
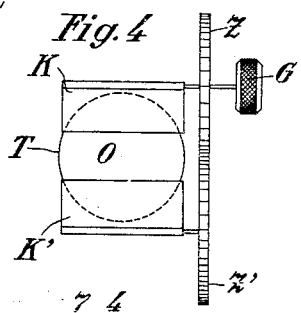
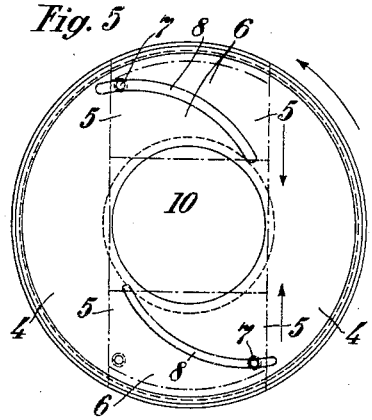
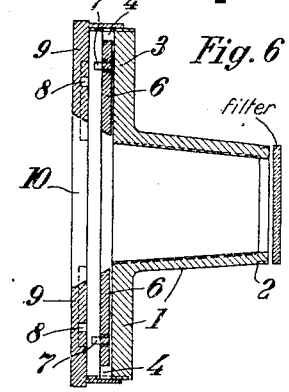
Inventor:
Gerd Heymer,
By Potter, Pierce & Scheffler,
Attorneys.

Patented Sept. 28, 1937

2,094,214

UNITED STATES PATENT OFFICE 2,094,214

DEVICE FOR STOPPING MULTICOLOR FILTERS

Gerd Heymer, Wolfen, Kreis Bitterfeld, Germany, assignor to Agfa Ansco Corporation, Binghamton, N. Y., a corporation of New York Application October 5, 1935, Serial No. 43,787
In Germany May 13, 1932

1 Claim. (Cl. 95—2)

My present invention relates to stopping of multi-color filters and more particularly to stopping of multi-color filters in taking pictures on lenticular film. It is a continuation in part of my application Ser. No. 670,160 filed May 9, 1933.

One of its objects is to provide an improved device for this purpose. Further objects will be seen from the detailed specification following hereafter. Reference is made to the accompanying drawing in which Fig. 1 shows a diagrammatic section through an objective provided with a multi-color filter and a device according to this invention, Fig. 2 illustrates the manner in which the multi-color filter is obturated by the stop shown in Fig. 1, Fig. 3 shows diagrammatically a device according to this invention mounted on the tube of an objective in such a manner that it covers the regulating ring for the iris diaphragm, Fig. 4 shows diagrammatically a front view of a device according to this invention, Fig. 5 shows a front view of another device according to this invention, and Fig. 6 shows a sectional view of the device shown in Fig. 5.

In taking pictures on films bearing microscopic refracting lenticular elements, it is not possible to obturate the ordinary multi-stripe color filters by means of an iris diaphragm, as this would cause an untrue reproduction of colors. This drawback is overcome by using an objective which has an aperture larger than that of the color filter, i. e. the breadth of the filter composed of the several strips, and masking this objective laterally so that its aperture corresponds with that of the filter. The strips may then be masked by stopping them from their ends. Thus, for example when taking pictures on a color film known under the registered trade-mark "Agfa" and bearing microscopic refracting lenticular elements, by means of an objective having an aperture of $f/1.5$, the objective is obturated by the filter to such an extent that the original aperture perpendicular to the longitudinal direction of the filter strips and to the direction of the lenticular embossings respectively is utilized only to the extent of $f/2.8$. The obturation proper is caused by masking the filter strips in their longitudinal direction to the desired length. In most cases this was realized by using masks having suitable openings and fitted over the filter to mask the respective sections of the filter.

When photographing with an emulsion of lower speed, such as was formerly used, a few masks, for instance 2 or 3, were sufficient. For emulsions of a higher speed, however, the number of the masks required would become too large. Therefore, it is preferable to use a device by which the diaphragm aperture can be controlled continuously within wide limits. However, the provision of such an aperture in close proximity to the filter involves the difficulty owing to the fact that all modern objectives have a tubular extension which projects over the front lens in order to prevent "ghosts" and to increase brilliancy, so that the filter which for optical reasons is placed as close to the objective as possible, lies within the tube.

This invention is based on the observation that it is not necessary to mask the filter areas in their immediate vicinity, but the diaphragm may be disposed at a substantial distance from the filter in front of the objective, without sacrificing uniformity in the obturation of the color filter strips. Hence it becomes unnecessary to arrange the diaphragm within the tubular extension. According to this invention there is mounted on the front end of the tubular extension a diaphragm forming an aperture which is situated at a distance from the filter which is approximately equal to or exceeds the length of the tubular extension, whilst observing the condition that part of the aperture remains visible when viewed from any point of the image. If parts of the diaphragm aperture are no longer visible from all points of the image, the amount of light admitted to such image portions is indeed diminished. This, however, is of less importance for the marginal regions of the image, where this phenomenon occurs first, than for the central part of the image.

Referring to Fig. 1 of the accompanying drawing the objective O composed of several lenses has a tubular extension T projecting over the front lens. The multi-color filter is located at S.

The objectives hitherto used were generally so constructed that in the plane H at the anterior edge of the objective tube the bundles of rays contributing to bring two opposite points of the picture to focus no longer coincide perfectly. Thus, for instance, the bundle of rays, limited by the rays CA and EA, which brings point A to focus occupies only half the diameter of the tube, whereas the bundle of rays bringing point B to a focus and limited by the rays G—B and I—B occupies the other half diameter of the tube.

Fig. 2 is a front view of the diaphragm provided in the plane H for reducing the quantity of the incident light. It is seen that the diaphragm masks the light only in the direction of the lenticular elements but not perpendicularly thereto. In Fig. 1 the slot is so located that all the beams or part of the beams emanating from the uppermost and undermost points of the object to be photographed and correspond with the lower and upper edges of the image still penetrate the slot. The diaphragm constitutes therefore the smallest effective aperture of the objective when it is viewed from the image. On the contrary, in the direction perpendicular to the cylindrical lenses, the dimensions of the slot of the diaphragm are such that there is no lateral limitation when it is viewed from any point of the image through the filter. It is also seen that the arrangement of the diaphragm according to this invention presents the advantage that the full aperture of the objective can be used if desired.

The diaphragm may be constructed in various ways without departing from the scope of the invention.

In Figs. 3 and 4 one form of diaphragm is shown by way of example. In Fig. 3, T indicates the tube of an objective and N is the regulating ring for the iris diaphragm. The new diaphragm consists of the plates K and K', pivotally mounted on the ring R by means of two hinges M. As shown in Fig. 4, the two plates are connected with two intermeshing toothed wheels Z, Z' so that the diaphragm can be controlled by means of the milled knob G. When correctly mounted, the ring R of the attachment covers the diaphragm ring N. This expedient prevents the iris diaphragm of the objective from being moved inadvertently. The iris diaphragm must be completely opened when taking pictures on lenticular films. If required, the diaphragm ring R may be provided with an opening which allows observation of the mark for the control of the iris diaphragm.

Instead of the diaphragm plates K and K' there may, of course, be adopted any mechanism capable of forming a slit of the desired breadth at the required distance in order to obturate the objective in the direction of the lenticular elements of the film. To this effect there may be used, for instance, two slides which can be moved upwards or downwards by means of a suitable guiding device, such as have already been proposed for obturating a multi-color filter in its immediate vicinity in a camera having no tubular extension in front of the objective.

Such a device which is distinguished by great simplicity is shown in Figs. 5 and 6 of the accompanying drawing. Referring to these figures, 1 is a cone shaped body which can be inserted in an objective tube and carries at its narrow end the filter which has been drawn somewhat spaced apart. At the broad end which protrudes from the tube there is mounted a circular plate 3 bearing two segmental plates 4 having parallel bordering lines. The pieces 4 are fixedly connected to the plate 3 and in the space between them there are mounted plates 6 which can slide in the direction of the arrows. The plates 6 are actuated with the aid of pins 7 which are mounted on the plates. The pins 7 slide in slots 8 of a circular cover plate 9 (which for better understanding has been drawn somewhat spaced apart) having an opening 10. By rotating the cover plate 9 in the direction of the arrow the plates may be moved against each other until the opening 10 is completely closed.

What I claim is:

An obturating device for use in taking pictures on a lenticular film with the aid of a multi-color filter, an objective and an objective mount having a tubular extension mounted thereon extending to a substantial distance in front of said mount, comprising a cone shaped body adapted to be introduced in said tubular extension, a filter with different color zones mounted on the narrower end of said cone-shaped body, a circular plate mounted on the broader end of said cone shaped body, two segmental plates mounted on said circular plate with their edges parallel with each other so as to leave a free space between them, narrow plates with their two neighboring edges parallel to each other and perpendicular to said color zones slidably mounted in said free space between said segmental plates, pins mounted on said narrow plates, a second circular plate having an opening and being provided with slots in which engage said pins rotatably mounted on said first circular plate, so that on rotation of said plate said narrow plates are moved against each other to close said opening.

GERD HEYMER.